3,471,320
CONDITIONING OF FORMED ARTICLES OF
ACRYLONITRILE - BUTADIENE - STYRENE
TERPOLYMER
Edward B. Saubestre, Hamden, and Juan Hajdu, New
Haven, Conn., assignors to Enthone, Incorporated,
New Haven County, Conn., a corporation of
Connecticut
No Drawing. Filed July 1, 1966, Ser. No. 562,120
Int. Cl. B44d 5/12; C08d 13/20
U.S. Cl. 117—47  32 Claims

ABSTRACT OF THE DISCLOSURE

Conditioning formed articles of acrylonitrile-butadiene-styrene terpolymer characterized by having one or more stressed terpolymer portions and/or one or more relatively soft terpolymer portions closely adjacent and forming a portion of the article surface, by subjecting such surface to the cation of nitric acid for a period sufficient to release the stresses when the terpolymer is stressed and to so modify the relatively soft terpolymer portion or portions when this condition occurs, as to result in a terpolymer surface bondable to a chemical reduction metal plating by a substantially uniformly firm bond.

---

This invention relates to the treatment of formed articles of acrylonitrile-butadiene-styrene terpolymer, and more especially to a new and improved process for conditioning formed articles of such terpolymer and in particular molded or extruded articles of acrylonitrile-butadiene-styrene terpolymer for preparing the terpolymer surface or surfaces for chemical reduction metal plating. Additionally, this invention relates to a new and improved process for the electroless metal plating of formed articles of such terpolymer, and the unplated and metal-plated terpolymer article products of the conditioning and electroless metal plating processes, respectively, herein.

Heretofore in the chemical reduction metal plating of injection molded articles of acrylonitrile-butadiene-styrene terpolymer, the problems have been encountered of cracking, disbonding, blistering and peeling of the composite metal plate, i.e. the chemical reduction metal plate and the one or more metal electroplates thereover, from the terpolymer surface, and also cracking of the terpolymer itself. These problems are not infrequently caused by the presence of stressed areas in the molded terpolymer closely adjacent and forming a portion of the article terpolymer surface. The "frozen" stresses in the stressed areas seek to release themselves and in so doing tend to concentrate on main stress lines in the terpolymer, resulting in the cracking of the terpolymer and usually also in the cracking and/or disbonding and peeling of the metal plate from the terpolymer surface.

The presence of the stressed areas in the molded acrylonitrile-butadiene-styrene terpolymer is due to the difficulty during the injection molding of maintaining absolutely uniform molding conditions on all surface areas of the terpolymer. With the application of nonuniform molding conditions to the terpolymer, "frozen" stresses are established in the terpolymer resulting in stressed areas being present in the terpolymer closely adjacent and forming a portion of the terpolymer article surface. "Gating" is a prime example of the application of non-uniform molding conditions to the copolymer surface areas during injection molding. Improper design of the gate of the injection molding apparatus and incorrect ram speeds tend to result in stressed areas in the terpolymer surface in the vicinity of the gate, the stressed areas being unsuitable for electroless metal plating. In addition to stressed areas or portions, one or more relatively soft areas or portions may be present closely adjacent and forming a portion of the molded terpolymer-article surface or surfaces, due to, for instance, the non-uniform molding of the terpolymer. The presence of these relatively soft portions is disadvantageous as the chromic acid-containing aqueous oxidizing acid solution utilized in converting the hydrophobic surface of the copolymer to a hydrophilic surface will attack and "overcondition" these soft terpolymer areas or portions resulting in degradation of the relatively soft terpolymer. The result will be unsatisfactory adherence or lack of adherence of the metal plate to the degraded terpolymer surface. Further the degraded spongy terpolymer absorbs appreciably greater amounts of sensitizer and activator than the surrounding properly conditioned terpolymer, with the result that initial rates of electroless metal plating are materially higher on such terpolymer areas or portions than on properly conditioned, non-degraded terpolymer portions resulting in metal deposits of poor formation or structure and poor adhesion of the metal to the terpolymer surface.

The problems of "frozen stresses" and stress cracking of the terpolymer and/or of the relatively soft terpolymer portions also tend to occur when the terpolymer is extruded or blow-molded to produce the formed or shaped article.

One object of this invention is to provide a new and improved process for conditioning the surfaces of formed articles of acrylonitrile-butadiene-styrene terpolymer having one or more stressed terpolymer portions and/or one or more relatively soft terpolymer portions closely adjacent and forming a portion of the article surface.

Another object is to provide a new and improved process for conditioning the surfaces of formed articles, especially molded or extruded articles, of acrylonitrile-butadiene-styrene terpolymer, having one or more stressed areas and/or one or more relatively soft areas or portions closely adjacent and forming a portion of the article surface, in preparation for the chemical reduction metal plating of the article surface.

Another object is to provide a new process for stress-relieving formed articles of acrylonitrile-butadiene-styrene terpolymer having one or more stressed areas closely adjacent and forming a portion of the article surface.

A further object is to provide a new and improved process for electrolessly metal plating formed articles of acrylonitrile-butadiene-styrene terpolymer having one or more stressed areas and/or one or more relatively soft areas closely adjacent and forming a portion of the article surface.

Still a further object is to provide new and valuable acrylonitrile-butadiene-styrene terpolymer product articles of the conditioning process and of the electroless metal plating process herein.

Additional objects and advantages will be apparent as the invention is hereinafter described.

In accordance with the present invention we have found that by subjecting the surface or surfaces of formed or shaped articles of acrylonitrile-butadiene-styrene terpolymer, especially molded or extruded articles of such terpolymer, characterized by having one or more stressed terpolymer portions or areas and/or one or more relatively soft terpolymer portions or areas closely adjacent and forming a portion of the article surface due to the conditions of molding or extruding, or for another reason, to the action of nitric acid, preferably nitric acid solutions of dilute or concentrated nitric acid strength for a time sufficient to achieve the desired results hereafter specified, the terpolymer is stress-relieved when the terpolymer is stressed and the relatively soft terpolymer portion or portions are so modified when this condition occurs, as to result in a terpolymer surface bondable to a chemical reduction metal plating by a uniformly or substantially uniformly firm bond. Further, when both the stressed terpolymer portion or portions and relatively soft terpolymer portion or portions are present, the action of the nitric acid is to accomplish both release of stresses from the terpolymer and to so modify the relatively soft terpolymer portion or portions as to result in a terpolymer surface bondable to the chemical reduction metal plating by the substantially uniformly firm bond. Nitric acid vapors are utilizable herein in place of the nitric acid solution for treatment of the acrylonitrile-butadiene-styrene terpolymer in accordance with this invention. By virtue of being stress-relieved, the terpolymer article will not undergo cracking due to concentration of stresses on main stress lines. Further, upon electrolessly metal plating the thus-treated terpolymer article by contacting the nitric acid-treated surface or surfaces with a chemical reduction metal plating solution, which is a salient use of the nitric acid treated terpolymer article herein, the metal plate will not crack, peel and/or disbond or blister from the terpolymer article surface due to the stress concentration or to the relatively soft terpolymer portion or portions.

In the utilization of the nitric acid treatment of the acrylonitrile-butadiene-styrene copolymer surface or surfaces of this invention in the preparatory portion of the chemical reduction metal plating process, the nitric acid treatment can be effected either prior to or subsequent to the step of converting the normally hydrophobic surface of the terpolymer to a hydrophilic surface which is receptive to the chemical reduction metal plating process aqueous solutions. After the nitric acid treatment and the converting of the hydrophobic terpolymer surface to the hydrophilic condition, the terpolymer article surface is activated, preferably with a prior sensitization of the terpolymer surface, and then electrolessly metal plated by contacting the activated terpolymer surface with, usually by immersing the activated surface in the chemical reduction metal plating solution for a time sufficient to effect the deposition thereon of the metal plate.

The nitric acid contacting of the terpolymer surface or surfaces having the stressed terpolymer portion or portions and/or the relatively soft terpolymer portion or portions, results in the entirety or substantial entirety of the terpolymer surface being bondable to the electroless metal plate or film by a uniformly firm bond. Treatment of the terpolymer article surface or surfaces having the relatively soft portion or portions thereon with the nitric acid prior to the converting or conditioning of the hydrophobic terpolymer surface to a hydrophilic condition, so conditions or modifies the relatively soft terpolymer areas or portions as to produce an entire or substantially entire terpolymer surface of substantially uniform reactivity with a chromic acid-containing aqueous oxidative conditioning solution of the subsequent further or second conditioning step. Consequently, there is no or substantially no "overconditioning," i.e. chemical degradation of the terpolymer, of the article surface occurring during the second conditioning normal treatment period of the terpolymer surface with the chromic acid-containing aqueous conditioning solution which is typically a time in the range of about 1-5 minutes and the hydrophobic terpolymer surface is substantially uniformly conditioned or modified to a hydrophilic state during the second conditioning and the thus-conditioned terpolymer surface is then bondable, after activation of its surface, to an electroless metal plate or deposit by a uniform or substantially uniform firm bond. Treatment of the article terpolymer surface or surfaces having the relatively soft terpolymer portion or portions with the nitric acid, after the converting with the chromic acid-containing aqueous conditioning solution to obtain a hydrophilic condition of the terpolymer surface, involves a nitric acid treatment of a terpolymer surface having "overconditioned" or chemically degraded terpolymer in those terpolymer portions corresponding to the initially relatively soft terpolymer portions. However, the nitric acid treatment of such "overconditioned" terpolymer of the soft portion or portions overcomes the deleterious effects of the "overconditioning" by so modifying the "overconditioned" terpolymer portion or portions as to produce a uniform entire or substantially entire terpolymer surface and which is more uniformly absorptive of the sensitizor and bondable to the subsequent electroless metal plate by a uniformly firm bond. Although we do not wish to be bound by theory, it is believed that the nitric acid treatment effects a hardening of the relatively soft degraded terpolymer areas or portions and causes the degraded terpolymer fibers to curl and interlock to thereby overcome the sponginess of the degraded terpolymer and the appreciably greater absorption capability of the spongy degraded terpolymer. The action of the nitric acid on the soft degraded terpolymer appears to be analogous to the waterproofing of a textile or fabric so that the absorption capacity or capability of the soft degraded terpolymer, after the nitric acid treatment, is materially reduced and substantially that of the surrounding properly conditioned initially non-degraded terpolymer.

Although the nitric acid conditioning treatment of this invention is eminently well suited for use in a chemical reduction metal plating procedure or cycle for preparing the acrylonitrile-butadiene-styrene terpolymer for chemical reduction metal plating, such conditioning is utilizable for purposes other than to prepare the terpolymer for electroless metal plating. Thus, for instance, the nitric acid treatment herein may be utilized for stress relieving molded or extruded articles of acrylonitrile-butadiene-styrene terpolymer having stressed terpolymer portions and not intended or destined to be electrolessly metal plated, but solely to prevent stress cracking of such formed articles occurring, for instance, upon exposing the articles to elevated temperatures for an appreciable time followed by exposing the articles to room temperature or to temperatures below room or ambient temperature.

In the chemical reduction metal plating process herein, after the nitric acid treatment and the converting of the hydrophobic terpolymer surface to a hydrophilic condition, the hydrophilic terpolymer surface or surfaces are preferably sensitized and then activated after which the surface is electrolessly metal plated. Water rinsing of the terpolymer surface is preferably carried out after each step and prior to a succeeding step of the plating process. The electroless metal plating can be with, for example, copper or nickel, by immersing the activated terpolymer surface in a chemical reduction copper or nickel plating bath for a period sufficient to plate a film or deposit of metallic copper or nickel thereon, and to render the terpolymer surface electrically conductive. The thus-plated terpolymer article or articles are then usually electroplated with for example copper or nickel.

The nitric acid solutions utilized herein are preferably aqueous solutions of nitric acid, and can be of a wide range of acid concentrations. Preferred nitric acid aqueous solutions herein have a nitric acid concentration in the range from about 25%-70% by weight. The nitric acid fumes comprise a mixture of $NO_2$ and water vapor. $O_2$ will also normally be present in such fumes. The terpolymer article surface or surfaces are subjected to the action of the nitric acid solution by contacting the article surface or surfaces with the acid by, for instance, immersing the article surface or surfaces in the nitric acid solution or otherwise applying the nitric acid solution onto the article surface, preferably by immersion. The terpolymer article surface or surfaces are subjected to the action of the nitric acid fumes by contacting the article surface or surfaces with such fumes, for instance, by mounting, holding or securing the terpolymer article over an open vessel containing nitric acid from which such acid fumes are being evolved. The nitric acid fumes can be evolved from the liquid nitric acid, for instance, by heating the liquid nitric acid to a temperature sufficiently elevated to cause such fumes to be evolved.

The nitric acid treatment of the article terpolymer surface having the stressed area or areas or portions is carried out either before or after the converting to produce the hydrophilic terpolymer surface, and for a period sufficient to stress relieve the terpolymer. The stress-relieved state or condition of the terpolymer is readily determined by the glacial acetic acid test hereinafter disclosed. The nitric acid treatment of the article terpolymer surface having the relatively soft portion or portions more susceptible to oxidative degradation and free of or also having the stressed portion or portions, is carried out prior to or after the conditioning or converting step to provide the hydrophilic terpolymer surface, and for a period sufficient to so modify the entirety or substantial entirety of the article terpolymer surface, in addition to stress-relieving the terpolymer when stressed areas are present, as to result in a terpolymer surface which is ultimately bondable to the chemical reduction metal plating by a uniformly firm bond. Preferred times for carrying out the nitric acid treatment of the terpolymer surface having both the relatively soft portion or portions and the stressed portion or portions prior to the conditioning to produce the hydrophilic surface are in the range of about ½–4 minutes; for carrying out the nitric acid treatment of the terpolymer surface having only the relatively soft portion or portions prior to the conditioning to produce the hydrophilic surface are in the range of about ½–4 minutes; for effecting the nitric acid treatment of the terpolymer surface having only the relatively soft portion or portions after such conditioning to produce the hydrophilic surface in the range of about ½–4 minutes; for carrying out the nitric acid treatment of the terpolymer surface having both the stressed area or areas and relatively soft area or areas after such conditioning to produce the hydrophilic surface are in the range of about ½–4 minutes; and for effecting the nitric acid treatment of the terpolymer surface having the stressed area or areas prior to the converting to obtain a hydrophilic terpolymer surface are in the range of about ½–4 minutes.

The nitric acid contacting herein can be carried out at room temperature in the case of the nitric acid solutions. However, temperatures of the nitric acid aqueous solution slightly below room temperature and elevated temperatures of the acid aqueous solution above room temperature can also be utilized for the contacting so long as the temperature of the nitric acid is below a temperature which detrimentally affects the acrylonitrile-butadiene-styrene terpolymer.

The action of the nitric acid treatment of the formed terpolymer surface or surfaces herein appears to be a nitration of the terpolymer surface, to produce a small amount of a nitro organic compound or compounds substantially uniformly distributed over the terpolymer surface. The terpolymer surface being subjected to the nitric acid treatment typically undergoes a color change from greenish to a light yellowish color, which is indicative of the apparent nitrating of the terpolymer by the nitric acid.

The existence of the stressed area or areas on the acrylonitrile-butadiene-styrene terpolymer article surface is readily detectable by immersing the terpolymer article surface in the glacial acetic acid for one to two minutes at room temperature. The development of white areas on the terpolymer surface is indicative of the stressed areas which are undesirable surface areas for electroless plating. This glacial acetic acid test can be employed before and/or after the nitric acid treatment of this invention to determine the presence of the stressed areas and the extent of such areas, and also to determine if all or virtually all stresses have been released from the terpolymer by the nitric acid treatment.

The acrylonitrile-butadiene-styrene terpolymer hydrophobic surface or surfaces are converted to a hydrophilic surface or surfaces by a chemical converting or conditioning involving the contacting of the hydrophobic surface or surfaces with an aqueous acid oxidizing solution comprising chromic acid, usually by immersing the hydrophobic surface or surfaces in the chromic acid-containing oxidizing solution. Less preferably, the converting to the hydrophilic surface is done by mechanically roughening the hydrophobic terpolymer surface or surfaces by, for instance, abrasive blasting with, e.g. sand or aluminum oxide, or by contacting the surface or surfaces with an etchant, for example a mixture of 10 oz./gal. chromic acid and 32 fl. oz./gal. of sulfuric acid.

A preferred conditioning solution herein for converting the acrylonitrile-butadiene-styrene terpolymer hydrophobic surface to a hydrophilic surface is an aqueous acid oxidizing solution comprising chromic acid, phosphoric acid and sulfuric acid. The weight ratio of the sulfuric acid to the orthophosphoric acid is preferably in the ratio range of about 0.1:1 to about 5:1 respectively, and the weight ratio of the orthophosphoric acid to chromic acid ($CrO_3$) is preferably within the ratio range of about 10:1 to about 95:1 respectively. The water is preferably contained in such preferred conditioning solution in amount of about 5–30 weight percent of the product conditioning solution, and includes the water present in the acids.

Prior to subjecting the terpolymer surface or surfaces to the action of the nitric acid in accordance with this invention and to the converting step to render the surface hydrophilic, if not already clean, the terpolymer surface or surfaces are cleaned, preferably by being chemically cleaned by immersion in an alkaline cleaner, preferably a non-silicated alkaline cleaner. Exemplary of such alkaline cleaners is the aqueous cleaner composition set forth hereafter:

|  | Grams per liter |
|---|---|
| Borax | 30 |
| Sodium pyrophosphate | 30 |

After cleaning, the terpolymer surface or surfaces are rinsed with water.

The thus-cleaned terpolymer surface or surfaces are then preferably treated with an acidic solution to neutralize any residual alkaline cleaner still present on the terpolymer. Such acid neutralization treatment may be carried out, for instance, by immersing the cleaned terpolymer article surface or surfaces in, for example, a sulfuric acid-containing aqueous solution although other acid solutions may be utilized for the neutralizing if desired.

If a mechanical roughening is to be employed in connection with the converting of the terpolymer surface to a hydrophilic condition, this cleaning step may often be omitted even if the terpolymer surface is unclean as the mechanical roughening itself will also serve to effect a cleaning of the terpolymer surface or surfaces.

The terpolymer surface is then subjected to the nitric acid treatment in accordance with this invention, and such nitric acid treatment can be prior to or after the converting or conditioning step to obtain a hydrophilic terpolymer surface from its normally hydrophobic state.

The converting of the hydrophobic terpolymer surface to a hydrophilic surface is effected by, for instance, immersing the terpolymer article surface or surfaces in an aqueous acid oxidizing solution containing chromic acid. Exemplary of such chromic acid-containing oxidizing solutions are:

CHROMIC ACID-CONTAINING OXIDIZING SOLUTION #1

| | Percent by weight |
|---|---|
| $H_2SO_4$ | 40 |
| $H_3PO_4$ | 39.5 |
| $CrO_3$ | 3.0 |
| $H_2O$ | 17.5 |

CHROMIC ACID-CONTAINING OXIDIZING SOLUTION #2

| | Percent by weight |
|---|---|
| $H_2SO_4$ | 53.0 |
| $H_3PO_4$ | 22.0 |
| $CrO_3$ | 1.7 |
| $H_2O$ | 23.3 |

The sulfuric acid of such acid-containing oxidizing solutions was 66° Bé. acid (98% $H_2SO_4$), the orthophosphoric acid was $H_3PO_4$ of 85% $H_3PO_4$ concentration, and the $CrO_3$ was commercial flake $CrO_3$. The terpolymer article surface is maintained immersed in the acid oxidizing solution for a time sufficient to convert the normally hydrophobic terpolymer surface to a hydrophilic surface, which is receptive to the aqueous solutions utilized in the chemical reduction metal plating process and readily bondable to the metal plating by a uniform and firmly adherent bond. The chromic acid-containing oxidizing solution oxidizes the terpolymer surface to such an extent, that it is not only hydrophilic in nature but open chemical valence bonds are actually provided in the terpolymer surface. These open bonds, which serve as reactive sites, provide at least in part for the firmly adherent bonding of the metal plate to the terpolymer surface. After such converting or conditioning step, the terpolymer surface is thoroughly rinsed with water.

The hydrophilic terpolymer surface is preferably then sensitized by contacting the same with a sensitizer solution, usually by immersing the terpolymer surface or surfaces in the sensitizer solution. A typical aqueous sensitizer solution is:

SENSITIZER SOLUTION

| $SnCl_2$ | g | 10 |
|---|---|---|
| HCl | ml | 40 |
| $H_2O$ | ml | 1000 |

After sensitizing, the terpolymer surface or surfaces is thoroughly rinsed with water.

The sensitized terpolymer surface is then activated by being contacted with an activator solution, usually by immersing the terpolymer article surface or surfaces therein. The following activator solution has been found to be a highly suitable activator and is exemplary of activator solutions that can be utilized:

ACTIVATOR SOLUTION

| $PdCl_2$ | g | 1 |
|---|---|---|
| HCl | ml | 10 |
| $H_2O$ | gallon | 1 |

After activation, the terpolymer surface is rinsed thoroughly with water.

Alternatively, the terpolymer surface or surfaces can first have the activator solution applied thereto followed by the sensitizer solution. The same redox reaction occurs, plating out the catalytic metal.

The activated terpolymer surface is then electrolessly metal plated with, for example, metallic copper or nickel, by contacting the activated surface or surfaces with a or surfaces in the aqueous plating bath, for a time sufficient and under conditions of pH and temperature to suitable chemical reduction metal plating aqueous solution or bath, usually by immersing the activated surface deposit thereon the metal plate with a uniformly or substantially uniformly firm bond. Exemplary of the chemical reduction metal plating aqueous solutions are the following:

ELECTROLESS COPPER BATH

| | Grams per liter of water |
|---|---|
| Copper sulfate | 29 |
| Sodium carbonate | 25 |
| Rochelle salt | 140 |
| Versene T | 17 |
| Sodium hydroxide | 40 |
| Formaldehyde (37% solution) | 166 |
| pH | 11.5 |
| Temperature °F | 70 |

"Versene T" is a soluble salt of ethylenediamine tetracetic acid readily obtainable in commerce.

ELECTROLESS NICKEL BATH

| | Grams per liter of water |
|---|---|
| Nickel chloride | 30 |
| Sodium glycolate | 50 |
| Sodium hypophosphite | 10 |
| Sodium citrate | 10 |
| NaOH | To adjust pH to pH 5.5–6. |
| Temperature | 140–150° F. |

Plating is continued with the electroless metal bath until the entire or substantially entire surface of the terpolymer is rendered electrically conductive.

The conductive terpolymer surface or surfaces can then be electroplated with, for example, copper or nickel in conventional manner. This electroplating can be followed, if desired, by any desired final plating, for instance, chrome, nickel-chromium, or nickel-gold electroplating also in conventional manner.

The thus metal-plated terpolymer article is then preferably subjected to a curing step involving the contacting of the plated terpolymer article with hot water, preferably by immersing the article in the hot water until even a stronger or firmer metal to terpolymer bond is obtained. The temperature of the hot water is preferably in the range of from about 130°–150° F., and the curing time is preferably in the range from about 15–25 minutes. The curing step effects a curing of the terpolymer and results in a stronger metal to terpolymer bond.

Acrylonitrile-butadiene-styrene terpolymer, or "ABS" terpolymers, are utilized in many areas of industry and are of considerable importance in the automotive, appliance and building hardware industries. The terpolymers exhibit a good balance of properties including chemical resistance, dimensional stability, heat resistance, toughness, rigidity, dielectric properties, and ease of processing and machining. The metal plated formed articles of such terpolymer provided by this invention are utilizable, for example, as garnish moldings and transmission selector lever knobs in the automotive industry, as appliance housings in the appliance field, and as pull handles in the building hardware industry.

The formed terpolymer article or structure treated by this invention may be formed, e.g. injection molded, terpolymer article as such of the terpolymer or the formed terpolymer article or structure may itself be bonded or secured to a layer or substrate of a different material, such as, for instance, a base metal, a refractory ceramic, or glass.

Product formed articles produced by this invention are articles of normally hydrophobic acrylonitrile-butadienestyrene terpolymer having one or more hydrophilic surfaces and having open bonds serving as reaction sites on the terpolymer hydrophilic surface. The hydrophilic terpolymer surface having the open bonds is uniformly firmly bondable to a chemical reduction metal plating, e.g. a chemical reduction copper or nickel plating, of a composite superposed chemical reduction metal plating-electroplate by a Jacquet Test terpolymer-metal bond strength of 9 pounds per inch or greater. Such articles, when initially having one or more stressed terpolymer portions closely adjacent and forming a portion of the article surface, are stress relieved in accordance with this invention prior to deposition thereon of the metal plating.

The following examples further illustrate the invention without being restrictive:

Example I

A plurality of injection-molded knobs of acrylonitrile-butadiene-styrene terpolymer or automatic transmission levers for automobiles, were immersed in glacial acetic acid at room temperature for 3 minutes. The knobs, which were free of cracks in their surface prior to their immersion in such acid, were then removed from the acid, rinsed with cold water and visually inspected. A plurality of very noticeable cracks were present in the surfaces of the knobs, attributed to cracking of the terpolymer along main stress lines.

Example II

A plurality of injection-molded acrylonitrile-butadiene-styrene terpolymer knobs for automobile automatic transmission selector levers, which were similar to the knobs tested in Example I and the surfaces of which knobs were free of cracks, were immersed in glacial acetic acid under the conditions and for the time employed in Example I. However, in this Example II, the terpolymer knobs were immersed in nitric acid aqueous solution of about 52% nitric acid concentration prior to being immersed in the glacial acetic acid. No cracks were present in the surface of the terpolymer knobs after removal from the acetic acid and rinsing with cold water.

Example III

Part A.—An injection-molded acrylonitrile-butadiene-styrene terpolymer lamp housing having crack-free surfaces was chemically cleaned by immersion in an aqueous alkaline cleaner solution of the following composition:

| | Grams/liter |
|---|---|
| Borax | 30 |
| Sodium pyrophosphate | 30 |
| Anionic wetter | 0.1 |

The cleaner solution was at a temperature of 140° F. and, after about 2 minutes in the solution, the lamp housing was removed from such solution and rinsed in cold water. The anionic wetter was a conventional anionic surface active wetting agent obtained in commerce. The terpolymer housing was then immersed in an acidic aqueous solution at a temperature of 70° F. for 1 minute for the purpose of neutralizing any residual alkaline cleaner on the housing. This acidic aqueous solution was of the following composition:

| | G./l |
|---|---|
| Sulfuric acid | 20 |
| Ammonium bifluoride | 2 |

The housing, after removal from the acidic solution, was subjected to a cold water rinse, and then conditioned by immersion in a chromic acid-containing conditioning solution at a temperature of 140° F. for 1 minute. The conditioning solution was of the following composition:

| | Percent by weight |
|---|---|
| $H_2SO_4$ | 40 |
| $H_3PO_4$ | 39.5 |
| $CrO_3$ | 3.0 |
| $H_2O$ | 17.5 |

The housing was then withdrawn from the chromic acid-containing conditioning solution and sensitized by immersion in a sensitizer solution of the following composition:

| | | |
|---|---|---|
| $SnCl_2$ | g | 10 |
| HCl | ml | 40 |
| $H_2O$ | ml | 1000 |

After about a half minute in the sensitizer solution, which was at a temperature of 70° F., the housing was removed from the solution and rinsed with cold water. The sensitized housing was then activated by immersion in an activator solution of the following composition:

| | | |
|---|---|---|
| $PdCl_2$ | g | 1 |
| HCl | ml | 10 |
| $H_2O$ | gal | 1 |

After about a half minute in the activator solution, which was at a temperature of 70° F., the housing was removed from such solution and rinsed with cold water. The activated terpolymer housing was then electrolessly copper plated by being immersed in a chemical reduction aqueous copper plating bath of the following composition:

| | Grams per liter of water |
|---|---|
| Copper sulfate pentahydrate | 7.3 |
| Formaldehyde (37% solution) | 39.2 |
| Rochelle salt | 57.2 |
| Sodium hydroxide | 12.8 |
| Sodium carbonate | 5.3 |

The housing was maintained immersed in this chemical reduction copper plating bath at a temperature of 70° F. until sufficient copper had plated out thereon to render the housing surfaces electrically conductive, which required about 6 minutes of immersion therein. The housing was then withdrawn from the chemical reduction copper plating bath, rinsed with cold water, and then electroplated with copper in an acid bright copper electroplating bath. The electroplating was carried out at a current density of 50 a.s.f. and for a time sufficient to deposit a copper electroplate of about 0.5 mil thickness. The thus-plated terpolymer housing was then withdrawn from the electroplating bath, rinsed with cold water, and then immersed in a hot water bath at a temperature of 140° F. for 15 minutes to cure the terpolymer. The plated housing was then withdrawn from the hot water and dried.

The thus-plated terpolymer housing was then subjected to a thermal cycling test which involved the following:

(1) Heated in oven for 1 hour at 180° F.
(2) Removed from oven and allowed to return to room temperature.
(3) Immersed in a cold box at 0° F. for 1 hour.
(4) Removed from the cold box and allowed to return to room temperature.
(5) Steps 1–4 supra constitute one complete thermal cycle, and steps 1–4 may be repeated a number of times as desired.

The metal plate on the terpolymer housing failed after 1 thermal cycle due to disbonding of the metal plate. The disbonding of the metal plate was attributed to stress cracking of the terpolymer.

Part B.—An injection molded acrylonitrile-butadiene-styrene terpolymer lamp housing having surfaces free of cracks and substantially identical to that of Part A of this Example III was treated and electrolessly copper plated and copper electroplated following the entire procedure of such Part A and employing substantially the same conditions as in Part A of this example except that the terpolymer housing was maintained immersed in the chromic acid-containing conditioner solution for 15 minutes instead of 1 minute as in Part A.

The thus-plated terpolymer housing was subjected to the same thermal cycling test as in Part A of this example, and the metal plate on the housing failed after 1 thermal cycle due to disbonding. The disbonding of the metal plate was attributed to stress cracking of the terpolymer.

Part C.—A molded acrylonitrile-butadiene-styrene terpolymer lamp housing having crack-free surfaces and substantially identical to that of Part A of this Example III was treated and electrolessly copper plated and copper electroplated following the entire procedure of such Part A and employing substantially the same conditions as in such Part A except that after withdrawal from the chromic acid-containing conditioning solution and water rinsing, the housing was immersed for 1 minute in a bath composed of 35% by volume of 36° Baumé nitric acid at room temperature and then withdrawn from this nitric acid aqueous solution and cold water rinsed before being immersed in the sensitizer solution.

The resulting metal-plated terpolymer housing was subjected to the same thermal cycling test as in Part A of this example, and the plated terpolymer housing went through 10 complete thermal cycles without evidence of disbonding of the metal plate from the terpolymer.

Part D.—A lamp housing of molded acrylonitrile-butadienestyrene terpolymer having crack-free surfaces and substantially identical to that of Part A of this Example III was treated and electrolessly copper plated and copper electroplated following the entire procedure of Part C of this example and employing substantially the same conditions as in Part C except that the aqueous nitric acid bath was composed of 100% by volume of 36° Baumé nitric acid, which corresponded to a nitric acid concentration of about 52%.

The resulting metal plated terpolymer housing was subjected to the same thermal cycling test as in Part A of this example, and the plated housing went through 10 complete thermal cycles without evidence of disbonding of the metal plate.

A comparison of the test results of Parts C and D of Example III utilizing the nitric acid treatment of this invention of the molded terpolymer article and the test results of Parts A and B of Example III not employing the nitric acid treatment, shows the considerable improvement provided by the nitric acid conditioning or treatment of this invention. Thus the metal-plated terpolymer articles of Parts C and D of Example III were able to withstand at least ten times as many complete thermal cycles as could the metal-plated terpolymer articles of Parts A and B of such Example III before the metal plates disbonded from the terpolymer.

Example IV

A plurality of injection-molded panels of acrylonitrile-butadiene-styrene terpolymer having crack-free surfaces and of dimensions of 4″ width, 6″ length and ⅛″ thickness were treated and electrolessly copper plated and copper electroplated following the entire procedure of Example III, Part A, and employing substantially the same conditions as in Example III, Part A, except that some of the panels, after withdrawal from the chromic acid-containing conditioning solution and water rinsing, were immersed for 2 minutes in an aqueous nitric acid solution of 26% nitric acid concentration at room temperature, and then withdrawn from this nitric acid solution and cold water rinsed before being immersed in the sensitizer solution.

The resulting copper-plated terpolymer panels not subjected to the nitric acid treatment showed an average bond strength of the composite copper plate to the terpolymer by the Jacquet Test of 5–6 lbs. per inch shortly after completion of the entire procedure of Example III, Part A, and of 8 lbs. per inch after aging 24 hours at room temperature after completion of the entire procedure of Example II, Part A. However, the resulting copper-plated terpolymer panels that had also been subjected to the nitric acid treatment showed an average bond strength of the composite copper plate to the terpolymer by the Jacquet Test of 9 lbs. per inch shortly after completion of the entire procedure of Example III, Part A, and including the nitric acid treatment and subsequent water rinsing, and of 13 lbs. per inch after aging 24 hours at room temperature after completion of such entire procedure. The appreciably greater average bond strength of the composite copper-plated terpolymer panels that had been nitric acid treated in accordance with this invention was attributed to the absence of stress cracking of the terpolymer of the panels, the stress cracking occurring in the terpolymer having the lower bond strengths of the copper plate thereto and not subjected to the action of the nitric acid.

Example V

A plurality of injection-molded panels of acrylonitrile-butadiene-styrene terpolymer panels having crack-free surfaces and of dimensions of 4″ width, 6″ length and ⅛″ thickness were treated and electrolessly copper plated and copper electroplated following the entire procedure of Example III, Part A, and employing substantially the same conditions as in Example III, Part A, except that some of the panels, after being withdrawn from the chromic acid-containing conditioning solution and water rinsing, were immersed for 2 minutes in an aqueous nitric acid solution of 52% nitric acid concentration at room temperature. After the nitric acid treatment, the panels were withdrawn from such acid solution and cold water rinsed prior to being immersed in the sensitizer solution.

The resulting copper-plated terpolymer panels that had not been treated with the nitric acid showed an average bond strength of the composite copper plate to the terpolymer by the Jacquet Test of 5–6 lbs. per inch shortly after completion of the entire procedure of Example III, Part A, and of 8 lbs. per inch after aging 24 hours at room temperature after completion of the entire procedure of Example III, Part A. The resulting copper-plated terpolymer panels that had also been subjected to the nitric acid treatment showed an average bond strength of the composite copper plate to the terpolymer by the Jacquet Test of 10 lbs. per inch shortly after completion of the entire procedure of Example III, Part A, and including the nitric acid treatment and subsequent water rinsing, and of 13 lbs. per inch after aging 24 hours at room temperature after completion of such entire procedure. The materially greater average bond strength of the copper-plated terpolymer panels that had been nitric acid treated in accordance with this invention was attributed to the absence of stress cracking of the terpolymer, with stress cracking occurring in the terpolymer having the lower bond strength of the copper plate thereto and not subjected to the action of nitric acid.

In testing the copper plate bond strengths of both the nitric acid-treated and nitric acid-untreated terpolymer panels which were copper plated in foregoing Examples IV and V, the Jacquet Tests were conducted on all plated panels of each example at substantially the same time after the entire plating procedure and after 24 hour aging treatment.

Example VI

A plurality of molded acrylonitrile-butadiene-styrene terpolymer knobs for automatic transmission selector levers for automobiles, the surfaces of which knobs were free of cracks, were metal plated following the cleaning, conditioning, sensitizing and activating procedure of Example III, Part A, except that some of the knobs, after withdrawal from the chromic acid-containing conditioning solution and water rinsing, were immersed for 2 minutes in an aqueous nitric acid solution of 26% nitric acid concentration at room temperature, and then withdrawn from this nitric acid solution and cold water rinsed before being immersed in the sensitizer solution. All knobs were then electrolessly nickel plated by immersion in a chemical reduction nickel plating bath at a temperature of 150° F. for 6 minutes, after which all knobs were electroplated with bright nickel and then electroplated with chrome.

All of the thus-plated knobs were then mounted on a steel rod and baked at 180° F. for 2 hours. All knobs not treated with nitric acid after the conditioning failed under the heating by developing longitudinal cracks in the terpolymer and the composite metal plate. Such cracks were attributed to residual stresses in the terpolymer. The knobs subjected to the nitric acid treatment after the conditioning stood up well under such heat treatment, and the composite metal plates were in good condition with no cracks in such metal plates.

The Jacquet Test, i.e. "pull" test, is a commonly used industrial test for adhesion of metals to plastics. In the Jacquet Test, a relatively thin metallic strip, which in the test runs herein was a composite metal strip of about 2 mils thickness and made up of an electrolytic metal plate over an electroless metal plate, is pulled at a 90° angle from the underlying polymer substrate. The force required, either to initiate or sustain at a steady rate of peeling of the metal from the polymer is recorded as the numerical value for the test. In Examples IV and V herein, the results of the Jacquet Test are given in lbs. per inch which means it required the specified number of pounds to pull a 1 inch wide strip of the metal plating such as the copper metal plating at a 90° angle from the underlying polymer surface.

Example VII

A plurality of injection-molded panels of acrylonitrile-butadiene-styrene terpolymer of dimensions of 4″ width, 6″ length and ⅛″ thickness and having a plurality of relatively soft terpolymer portions forming a portion of the surface of each panel due to the conditions of molding are treated and electrolessly copper-plated and copper-electroplated following the entire procedure of Example III, Part A, and employing substantially the same conditions as in Example III, Part A except that some of the panels, after withdrawal from the chromic acid-containing conditioning solution and water rinsing, are immersed for 3 minutes in an aqueous nitric acid solution of 52% nitric acid concentration at room temperature. Upon completion of this nitric acid treatment, all panels are withdrawn from the nitric acid solution and cold water rinsed before being immersed in the sensitizer solution.

All of the thus-obtained copper-plated terpolymer panels are then subjected to the thermal cycling test set forth in Example III, Part A. The copper plating of the plated terpolymer panels not treated with the nitric acid undergoes blistering after 1 thermal cycle, whereas the copper-plated terpolymer panels which are nitric acid-treated after the chromic acid-containing solution conditioning go through 7 complete thermal cycles without evidence of blistering or disbonding of the metal plate from the terpolymer. The blistering of the copper plating from the terpolymer panels not treated with the nitric acid solution is attributed to excessive absorption of sensitizer and activator solutions by "overconditioned," chemically degraded spongy terpolymer portions of the panels corresponding to the initially relatively soft terpolymer portions of such panels. Consequently, upon exposing the copper-plated terpolymer to the elevated temperatures of the thermal cycling, the occluded sensitizer and activator solutions are driven from the interstices in the interior of the degraded, spongy terpolymer resulting in the blistering of the copper plating.

Example VIII

A plurality of injection molded panels of acrylonitrile-butadiene-styrene terpolymer of the dimensions set forth in Example VII and having a plurality of relatively soft terpolymer portions forming a portion of the surface of each panel due to the molding conditions, are treated and electrolessly copper plated and copper electroplated following the entire procedure of Example III, Part A, and employing substantially the same conditions as in Example III, Part A except that some of the panels, after withdrawal from the acidic neutralizing solution and water rinsing and prior to immersing in the chromic acid-containing conditioning solution, are immersed for 2 minutes in an aqueous nitric acid solution of 26% nitric acid concentration at room temperature. All panels are then withdrawn from the nitric acid solution and cold water rinsed before being immersed in the sensitizer solution.

All of the thus-obtained copper-plated terpolymer panels are then subjected to the thermal cycling test set forth in Example III, Part A. The copper plating of the plated terpolymer panels not treated with the nitric acid undergoes blistering after 1 thermal cycle. However, the copper-plated terpolymer panels which are nitric acid treated prior to the conditioning with the chromic acid-conditioning solution, go through 7 complete thermal cycles without evidence of blistering or disbonding of the copper plating from the terpolymer. The blistering of the copper plating from the terpolymer panels not treated with the nitric acid solution is attributed to the same reasons as set forth in Example VII as being responsible for the blistering of the copper plating from the terpolymer panels in that example.

What is claimed is:

1. A process for conditioning formed articles of acrylonitrile-butadiene-styrene terpolymer, which comprises subjecting at least one surface of the terpolymer formed article having at least one stressed terpolymer portion closely adjacent and forming a portion of the article surface to the action of nitric acid for a period sufficient to release the stresses from the terpolymer.

2. The process of claim 1 wherein the nitric acid is a nitric acid aqueous solution.

3. The process of claim 2 wherein the nitric acid aqueous solution has a nitric acid concentration in the range from about 25%–70% by weight.

4. The process of claim 1 wherein the nitric acid is nitric acid fumes.

5. A process for conditioning formed articles of acrylonitrile-butadiene-styrene terpolymer, which comprises converting a normally hydrophobic surface of a formed article of a hydrophobic acrylonitrile-butadiene-styrene terpolymer having at least one stressed portion closely adjacent and forming a portion of the article surface to a hydrophilic surface, and contacting the article terpolymer surface with nitric acid for a period sufficient to release the stresses from the terpolymer.

6. A process for the electroless metal plating of formed articles of acrylonitrile-butadiene-styrene terpolymer, which comprises converting a normally hydrophobic clean surface destined to be electrolessly metal plated of a formed article of a hydrophobic acrylonitrile-butadiene-styrene terpolymer having at least one stressed portion closely adjacent and forming a portion of the article surface to a hydrophilic surface receptive to chemical reduction metal plating process aqueous solutions, contacting the article terpolymer surface with nitric acid for a time sufficient to stress-relieve the terpolymer, sensitizing the stress-relieved terpolymer article surface, activating the article surface, and then electrolessly metal-plating the article activated surface by contacting the activated surface with a chemical reduction metal-plating solution for a time sufficient to deposit thereon the metal plating.

7. The process of claim 6 wherein the nitric acid is a nitric acid aqueous solution.

8. The process of claim 7 wherein the nitric acid aqueous solution has a nitric acid concentration in the range from about 25%–70% by weight.

9. The process of claim 6 wherein the nitric acid is nitric acid fumes.

10. The process of claim 7 wherein the article terpolymer surface is water-rinsed subsequent to each step and prior to a succeeding step.

11. The process of claim 7 wherein the article terpolymer surface is electrolessly metal-plated with copper by contacting the activated surface with a chemical reduction copper-plating solution for a time sufficient to deposit thereon the copper plating.

12. The process of claim 7 wherein the article terpolymer surface is electrolessly metal-plated with nickel by contacting the activated surface with a chemical reduction nickel-plating solution at an elevated plating temperature non-detrimental to the terpolymer and for a time sufficient to deposit thereon the nickel plating.

13. The process of claim 7 wherein the article terpolymer surface is contacted with the nitric acid prior to being converted from a hydrophobic condition to a hydrophilic condition.

14. The process of claim 7 wherein the article terpolymer surface is contacted with the nitric acid subsequent to being converted from a hydrophobic condition to a hydrophilic condition.

15. The process of claim 7 wherein the article terpolymer surface is contacted with the nitric acid for a time in the range of about ½–4 minutes.

16. The process of claim 7 wherein the terpolymer article has been formed by injection molding.

17. The process of claim 7 wherein the conversion of the terpolymer hydrophobic surface to the terpolymer hydrophilic surface is effected by contacting the hydrophobic surface with an aqueous acid oxidizing solution comprising chromic acid, phosphoric acid and sulfuric acid.

18. A process for the electroless metal-plating of formed articles of acrylonitrile-butadiene-styrene terpolymer, which comprises converting a normally hydrophobic clean surface destined to be electrolessly metal-plated of a formed article of a hydrophobic acrylonitrile-butadiene-styrene terpolymer having at least one stressed terpolymer portion closely adjacent and forming a portion of the article surface and at least one relatively soft terpolymer portion more susceptible to oxidative degradation during a chromic acid-containing solution oxidative conditioning treatment than the remaining terpolymer relatively hard portions closely adjacent and forming a different portion of the terpolymer surface, to a hydrophilic surface receptive to chemical reduction metal-plating process aqueous solutions, contacting the article terpolymer with nitric acid for a period sufficient to release the stresses from the terpolymer and to so modify a substantial entirety of the article terpolymer surface as to result in a terpolymer surface bondable to the chemical reduction metal-plating by a uniformly firm bond, sensitizing the thus-treated article terpolymer surface, activating the article surface, and then electrolessly metal-plating the article activated surface by contacting the activated surface with a chemical reduction metal-plating solution for a time sufficient to deposit thereon the metal plating.

19. The process of claim 18 wherein the nitric acid is a nitric acid aqueous solution.

20. The process of claim 19 wherein the nitric acid aqueous solution has a nitric acid concentration in the range from about 25%–70% by weight.

21. The process of claim 18 wherein the nitric acid is nitric acid fumes.

22. The process of claim 18 wherein the article terpolymer surface is water-rinsed subsequent each step and prior to a succeeding step.

23. The process of claim 19 wherein the article terpolymer surface is contacted with the nitric acid aqueous solution subsequent to being converted to a hydrophilic condition by contacting with a chromic acid-containing aqueous oxidative conditioning solution, and at least one chemically-degraded, normally non-firmly metal plate-bondable terpolymer portion closely adjacent and forming a portion of the article terpolymer surface and corresponding to the initially relatively soft area of the terpolymer is thereby so modified as to result in a substantially entire terpolymer surface bondable to the chemical reduction metal-plating by a uniformly firm bond.

24. The process of claim 19 wherein the article terpolymer surface is contacted with the nitric acid aqueous solution prior to being converted to a hydrophilic condition, and the relatively soft portion of the terpolymer is thereby so modified as to produce a substantially entire terpolymer surface of substantially uniform chemical reactivity with a chromic acid-containing aqueous oxidative conditioning solution without substantial oxidative degradation of the terpolymer of the article surface during a normal conditioning treatment period of the terpolymer surface with said chromic acid-containing conditioning solution.

25. The process of claim 19 wherein the article terpolymer surface is contacted with the nitric acid for a time in the range of about ½–4 minutes.

26. A process for conditioning formed articles of acrylonitrile-butadiene-styrene terpolymer, which comprises subjecting to the action of nitric acid a surface of a formed article of an acrylonitrile-butadiene-styrene terpolymer having at least one terpolymer portion selected from the group consisting of stressed and relatively soft terpolymer portions closely adjacent and forming a portion of the terpolymer surface, for a time sufficient to stress-relieve the terpolymer when the terpolymer portion is stressed and to so modify the relatively soft terpolymer portion when the terpolymer has one or more relatively soft terpolymer portions as to result in a terpolymer surface bondable to a chemical reduction metal-plating by a uniformly firm bond.

27. A process for the electroless metal-plating of formed articles of acrylonitrile-butadiene-styrene terpolymer, which comprises converting a normally hydrophobic surface destined to be electrolessly metal-plated of a formed article of a hydrophobic acrylonitrile-butadiene-styrene terpolymer having at least one terpolymer portion selected from the group consisting of stressed terpolymer portions and relatively soft terpolymer portions closely adjacent and forming a portion of the terpolymer surface to a hydrophilic surface receptive to chemical reduction metal-plating process aqueous solution, contacting the article terpolymer surface with nitric acid for a period sufficient to release the stresses from the terpolymer when the terpolymer portion is stressed and to so modify the hydrophilic relatively soft terpolymer portion when the terpolymer has one or more relatively soft terpolymer portions as to result in a hydrophilic terpolymer surface bondable to a chemical reduction metal-plating by a uniformly firm bond, activating the thus-treated article terpolymer surface, and then electrolessly metal-plating the article activated surface by contacting the activated surface with a chemical reduction metal-plating solution for a time sufficient to deposit thereon the metal plating.

28. The process of claim 27 wherein the nitric acid is a nitric acid aqueous solution.

29. The process of claim 28 wherein the nitric acid aqueous solution has a nitric acid concentration in the range from about 25%–70% by weight.

30. The process of claim 27 wherein the nitric acid is nitric acid fumes.

31. The process of claim 28 wherein the article terpolymer surface is contacted with the nitric acid for a time in the range of about ½–4 minutes.

32. The process of claim 28 wherein the terpolymer article has been formed by injection molding.

References Cited

UNITED STATES PATENTS

| | | | |
|---|---|---|---|
| 2,934,457 | 4/1960 | Elliott | 117—47 X |
| 3,167,491 | 1/1965 | Harrison et al. | 117—47 X |
| 3,248,271 | 4/1966 | Rielly et al. | 117—47 X |

OTHER REFERENCES

Saubestre et al.: Metal Finishing, November 1964, p. 55.

RALPH S. KENDALL, Primary Examiner

U.S. Cl. X.R.

117—138.8, 160; 264—340

UNITED STATES PATENT OFFICE
CERTIFICATE OF CORRECTION

Patent No. 3,471,320                              October 7, 1969

Edward B. Saubestre et al.

It is certified that error appears in the above identified patent and that said Letters Patent are hereby corrected as shown below:

Column 1, line 21, "cation" should read -- action --. Column 3, line 9, after "strength" insert a comma; line 51, after "in" insert a comma. Column 8, line 1, before "or surfaces" insert -- suitable chemical reduction metal plating aqueous solution or bath, usually by immersing the activated surface --; lines 3 and 4, cancel "suitable chemical reduction metal plating aqueous solution or bath, usually by immersing the activated surface"; line 67, after "be" insert -- the --. Column 12, line 5, "II" should read -- III --.

Signed and sealed this 26th day of May 1970.

(SEAL)
Attest:

EDWARD M. FLETCHER, JR.                      WILLIAM E. SCHUYLER, JR.
Attesting Officer                             Commissioner of Patents